US007806364B1

(12) United States Patent
Udall

(10) Patent No.: US 7,806,364 B1
(45) Date of Patent: Oct. 5, 2010

(54) CONTAINMENT SYSTEM FOR A GAS TURBINE ENGINE

(75) Inventor: Kenneth F Udall, Derby (GB)

(73) Assignee: Rolls-Royce PLC, London (GB)

( * ) Notice: Subject to any disclaimer, the term of this patent is extended or adjusted under 35 U.S.C. 154(b) by 749 days.

(21) Appl. No.: 11/651,553

(22) Filed: Jan. 10, 2007

(30) Foreign Application Priority Data

Feb. 7, 2006 (GB) ................................ 0602362.6

(51) Int. Cl.
*B64D 27/00* (2006.01)

(52) U.S. Cl. .......................... 244/54; 415/9; 415/213.1; 60/39.091; 60/226.1

(58) Field of Classification Search ............. 60/39.091, 60/223, 226.1; 244/58, 60; 415/9, 213.1, 415/214.1, 220
See application file for complete search history.

(56) References Cited

U.S. PATENT DOCUMENTS

| | | | | |
|---|---|---|---|---|
| 2,608,056 | A * | 8/1952 | Secord et al. | 60/802 |
| 3,093,361 | A | 6/1963 | Hooker et al. | |
| 3,540,682 | A * | 11/1970 | Howard et al. | 244/53 R |
| 3,735,946 | A * | 5/1973 | Mullins | 244/54 |
| 3,974,313 | A * | 8/1976 | James | 428/176 |
| 5,694,765 | A * | 12/1997 | Hield et al. | 60/39.163 |
| 6,575,694 | B1 * | 6/2003 | Thompson et al. | 415/9 |

FOREIGN PATENT DOCUMENTS

| | | | |
|---|---|---|---|
| GB | 2 262 313 | A | 6/1993 |
| GB | 2 281 941 | A | 3/1995 |
| GB | 2 288 639 | A | 10/1995 |
| GB | 2 365 925 | A | 2/2002 |

* cited by examiner

*Primary Examiner*—Edward Look
*Assistant Examiner*—Ryan H Ellis
(74) *Attorney, Agent, or Firm*—Oliff & Berridge, PLC

(57) ABSTRACT

A containment system for a gas turbine engine comprises a force absorbing arrangement for absorbing the force exerted thereon by an ejected portion of a failed component of the engine. The force absorbing arrangement circumferentially surrounds a major proportion of the axial length of the engine.

20 Claims, 6 Drawing Sheets

CONTAINMENT SYSTEM FOR A GAS TURBINE ENGINE

This invention relates to containment systems for gas turbine engines.

The mounting of gas turbine engines above the fuselage of an aircraft has advantages with respect to noise reduction. However, there may be some issues concerning rotor failures that need to be addressed.

According to one aspect of this invention, there is provided a containment system for a gas turbine engine, the containment system comprising a force absorbing arrangement for absorbing the force exerted thereon by an ejected portion of a failed component of the engine, wherein the force absorbing arrangement circumferentially surrounds at least a major proportion of the axial length of the engine.

The aforesaid component may comprise a high energy component. The component may comprise a disk. The component may comprise a compressor or a turbine disk.

Preferably, the force absorbing arrangement extends substantially the axial length of the engine.

Preferably, the force absorbing arrangement comprises a force absorbing material. A suitable material is a polyamide, such as an aramid, typically a para-aramid. In one embodiment, the force absorbing material may comprise poly-paraphenylene terephthalamide. An example of poly-paraphenylene terephthalamide is sold under the registered trade mark KEVLAR.

The engine may include rotary driving components. A casing may surround the rotary driving components. The rotary driving components may comprise a fan, a compressor arrangement, and a turbine arrangement.

The casing may comprise radially inner and outer skins. The force absorbing arrangement may be provided on the casing, preferably between the inner and outer skins of the casing. In one embodiment, the casing may comprise a nacelle for surrounding the engine. The force absorbing arrangement may be provided as a layer on one of the inner and/or outer skins. Desirably, the force absorbing arrangement is provided on the inner skin.

Alternatively or in addition, the force absorbing arrangement may comprise a corrugated outer skin of the casing.

A plurality of support members may be provided within the casing. Each support member may extend circumferentially around the casing, and may extend from the inner skin to the outer skin. In a preferred embodiment, the support members provide strengthening between the inner and outer skins. Each support member may constitute a bulkhead extending from the inner skin to the outer skin of the casing.

The support members may be spaced from one another axially along the casing. The support members may divide the casing into a plurality of compartments. A pedestal may extend from the casing to mount the engine on an aircraft. In one embodiment, support members extend to the pedestal. Thus, in this embodiment, each support member transmits loads thereon to the pedestal.

The provision of the support members provides the advantage in an embodiment of the invention that a load exerted on the force absorbing arrangement is constrained by the support members to prevent excessive deformation of the casing and of force absorbing material.

Where the engine includes a fan, the force absorbing arrangement may comprise a portion of the force absorbing material surrounding the fan, and a further portion of the force absorbing material circumferentially surrounding the remainder of the rotary components.

Where the gas turbine engine includes an intermediate case, arranged between the high pressure and intermediate pressure compressor, the force absorbing material may comprise a first portion of the force absorbing material extending from a region surrounding the fan to a region surrounding the intermediate pressure compressor of the engine. The force absorbing arrangement may comprise a second portion of the force absorbing material extending from a region surrounding the high pressure compressor to a region surrounding or downstream of the low pressure turbine.

The force absorbing material may be wrapped around the engine with appropriate tension to allow the force absorbing material to deform radially outwardly within the casing when absorbing the force of the ejected portion of the failed component. The outer skin of the casing may be formed of a corrugated material to allow radially outward deformation thereof if the force absorbing material impacts thereon on radially outwardly formation of the force absorbing material. The engine may be secured to the case by strengthening arrangements. Each strengthening arrangement may comprise an A frame extending from the engine to the casing. In one embodiment, the force absorbing portion may comprise a corrugated outer skin.

According to another aspect of this invention, there is provided an engine arrangement comprising a gas turbine engine having a containment system as described above: and a pedestal to support the engine on an aircraft.

Preferably, the containment system includes a casing extending circumferentially around rotary driving components of the engine, as a plurality of support members extending circumferentially around the casing wherein each support member extends to the casing. Thus, loads of support members can be transmitted to the pedestal.

The engine arrangement may include a chamber externally of the engine to include ancillary components of the engine. The ancillary components may include a power off take arrangement to extract power from a main shaft of the engine. The power off take arrangement may include an off take shaft extending from the aforesaid main shaft of the engine to the chamber, and a gear arrangement to transmit rotary power from the shaft to further components.

Embodiments of the invention will now be described by way of example only, with reference to the accompanying drawings, in which.

Figure 1A:
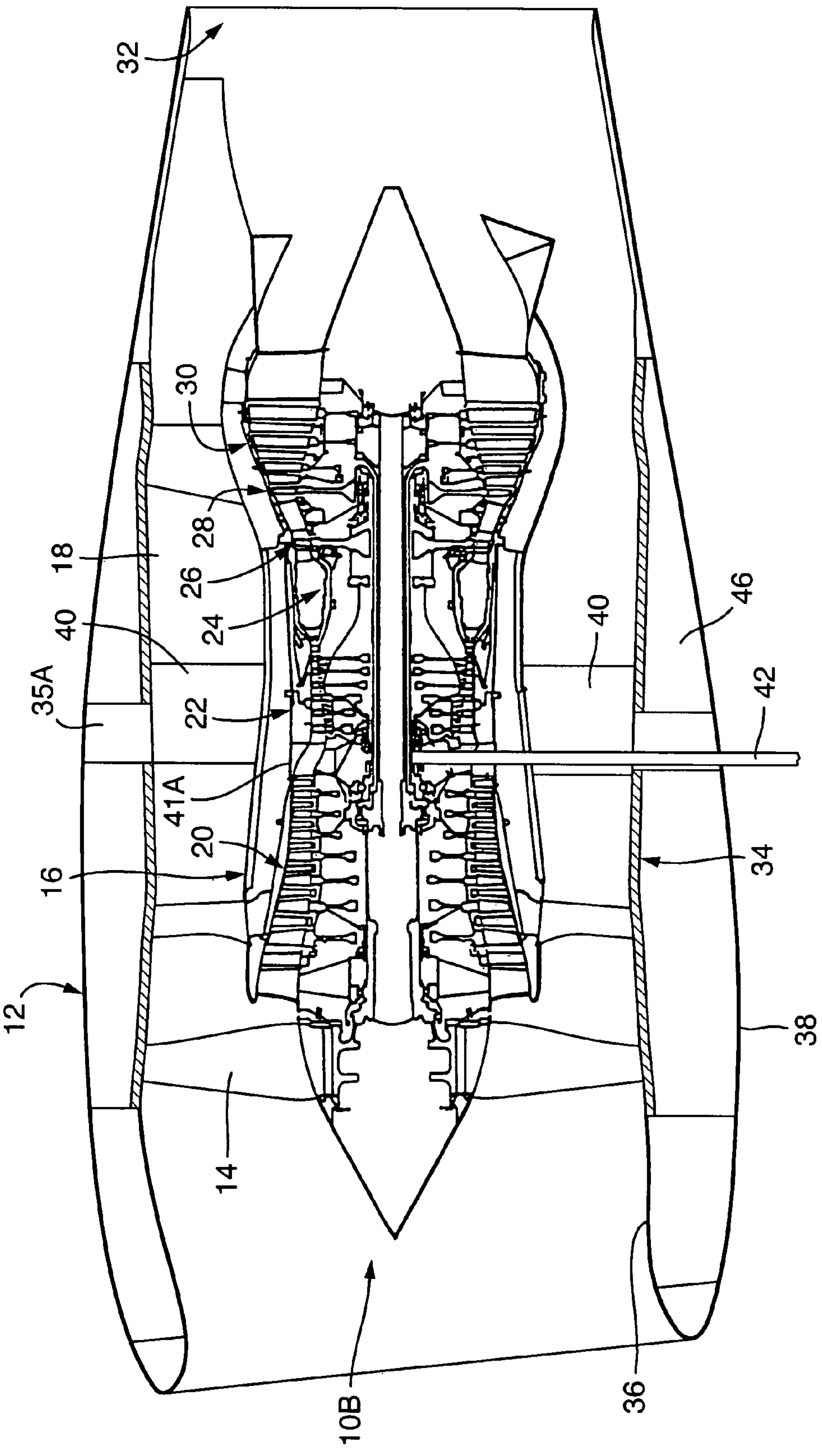
FIG. 1A is a sectional side view of a three shaft gas turbine engine, with a nacelle surrounding the engine.

Referring to FIG. 1A, there is shown a sectional side view of a three shaft gas turbine engine 10A housed in a nacelle 12. The engine 10A comprises a fan 14 and an engine core 16. A bypass duct 18 is defined between the nacelle 12 and the engine core. The engine core 16 comprises an intermediate compressor 20, a high pressure compressor 22, a combustor 24 and high, intermediate and low pressure turbines 26, 28, 30 respectively.

Figure 1B:
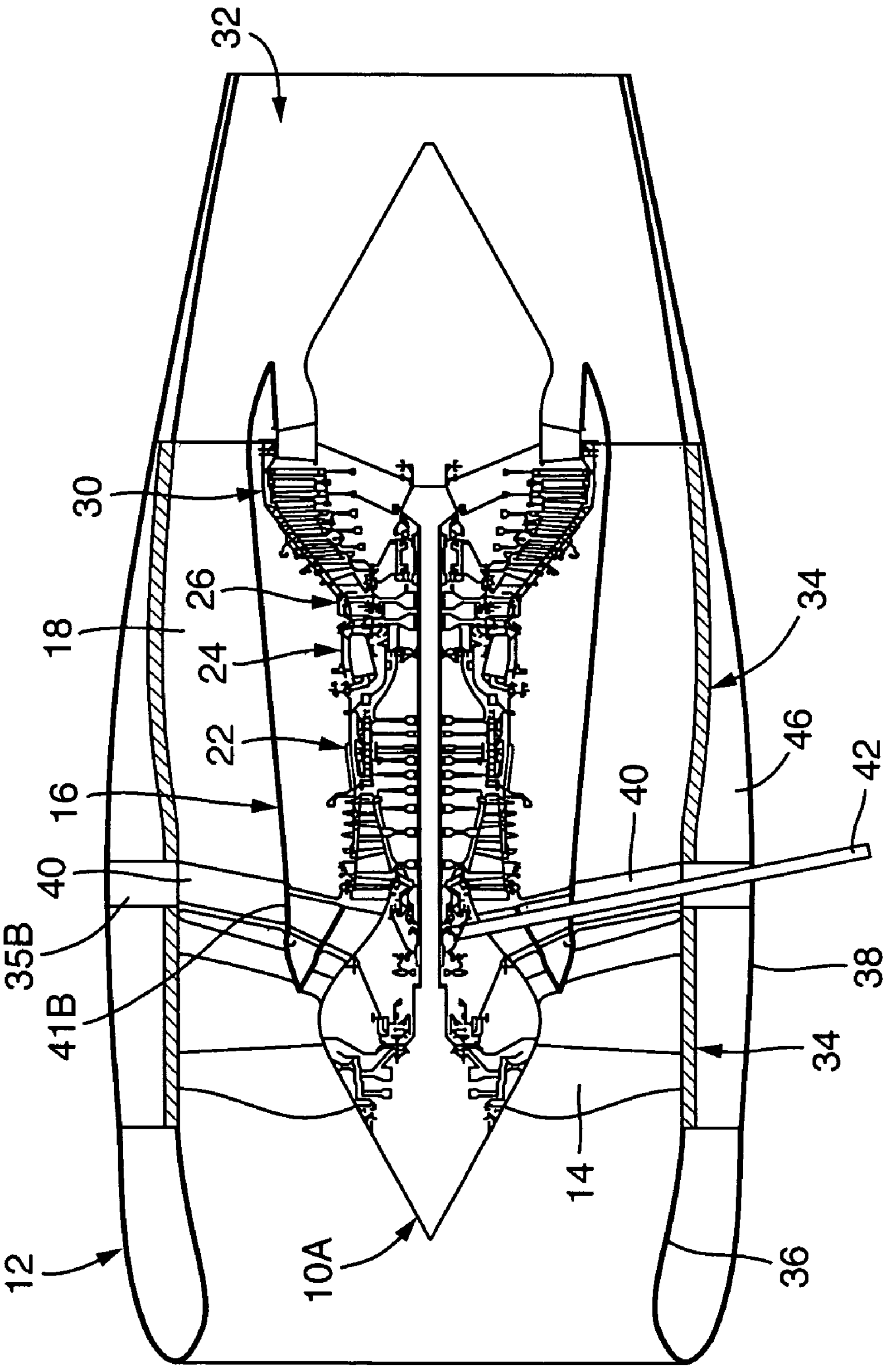
FIG. 1B is a sectional side view of a two shaft gas turbine engine, with a nacelle surrounding the engine.

FIG. 1B shows a sectional side view of a two shaft gas turbine engine 10B housed in a nacelle 12. The engine 10A comprises an engine core 16. A bypass duct 18 is defined between the engine core 16 and the nacelle 12. The engine core 16 comprises a high pressure compressor 22, a combustor 24, and high and low turbines 26, 30 respectively.

Some of the air driven by the fan 14 passes along the bypass duct 18 to be exhausted through an exhaust nozzle 32 to provide a propulsive force. The remainder of the air driven by the fan 14 passes through the engine core 16 to the exhaust via the exhaust nozzle 32.

The fan 14, the compressors 23, 24 and the turbines 26, 28, 30 are mounted on rotating discs.

In each embodiment shown in FIGS. 1A and 1B, the nacelle 12 is provided with a force absorbing material 34 provided around the fan 14 and the engine core 16. The force absorbing material 34 is provided to absorb the force from a fragment of a failed disc, and to contain the fragment within the nacelle 10.

The nacelle 12 is formed of inner and outer skins 36, 38, and the force absorbing material is provided as a layer between the inner and outer skins 36, 38 on the inner skin 36.

The force absorbing material 34 is in the form of poly-paraphenylene terephthalamide. A suitable poly-paraphenylene terephthalamide is sold under the registered trade mark KEVLAR.

The force absorbing material is wrapped around the inner skin 36 of the nacelle 12 with appropriate low tension to allow it to deform radially outwardly in the event of impact thereon by a failed fragment of a rotating component such as a compressor or turbine disc.

The force absorbing material 34 extends substantially the axial length of the engine, to the region upstream of the fan 14 to a region downstream of the low pressure turbine 30. Thus, the rotating components of the engines 10A and 10B are circumferentially surrounded by the force absorbing material 34.

In the embodiment shown in FIG. 1A, a central region 35A of the nacelle 12 is not covered by the force absorbing material 34, because this region is strengthened by struts 40. The central region 35A of the nacelle 12 generally circumferentially surrounds an intermediate case 41A from which the struts 40 extend. In the three shaft engine 10A shown in FIG. 1A, the intermediate case 41A is provided between the intermediate pressure compressor 20 and the high pressure compressor or 22.

In the embodiment shown in FIG. 1B, a central region 35B of the nacelle 12 is not covered by the force absorbing material 34, because this region is strengthened by struts 40. The central region 35B of the nacelle 12 generally circumferentially surrounds an intermediate case 41B from which the struts 40 extend. FIG. 1B the intermediate case 41B is provided generally upstream of the high pressure compressor 22 and downstream of the fan 14.

In the above described embodiment, the ancillary components of the engine, such as the power take off gearbox are held within a chamber in the aircraft fuselage, and this is described in more detail below with reference to FIG. 5. FIG. 1 shows an off take shaft 42 extending from a main shaft of the engine 10 to the off take gearbox. The off-take shaft 42 extends through one of the struts 40.

Figure 2:
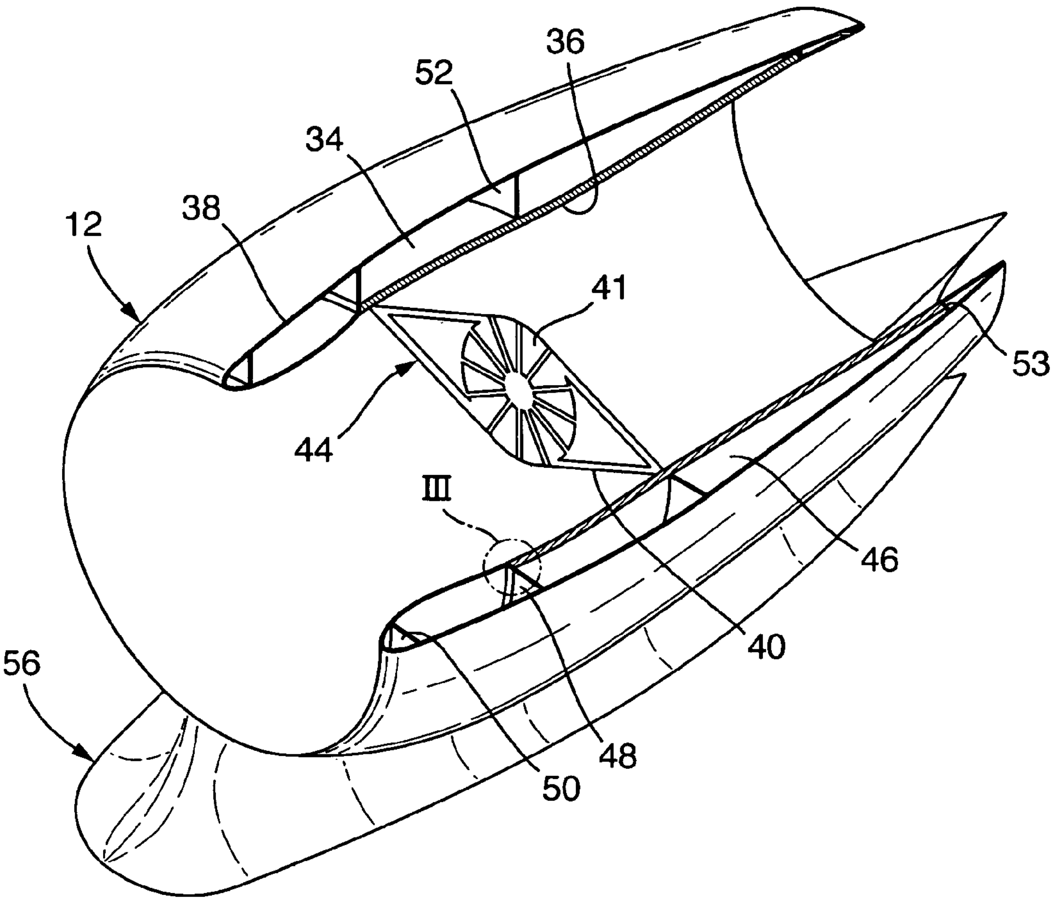
FIG. 2 is a part sectional view of the nacelle shown in FIG. 1 supported by a pedestal.
Figure 3:
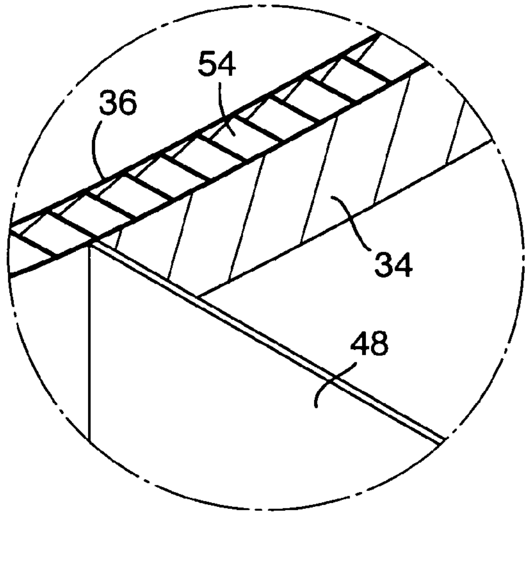
FIG. 3 is a view of the region marked III in FIG. 2.

Referring to FIGS. 2 and 3, FIG. 2 shows a part sectional perspective view of the nacelle 12 of the gas turbine engine. The intermediate case 41A or 41B is shown, together with the struts 40 in the form of A frames 44 extending from the intermediate case 41A or 41B to the nacelle 12. It is in the regions where the A frames 44 engage the inner skin 36 of the nacelle 12 that if desired, the nacelle can be devoid of the force absorbing material. However, as shown in FIG. 2, the force absorbing material can extend without a gap along the inner skin 36 of the nacelle 12.

The inner and outer skins 36, 38 define between them a circumferentially extending space 46, and within the space 46 are provided a plurality of support members in the form of annular bulkheads 48, 50, 52, 53 each of which extends around the nacelle 12. The bulkheads 48, 50, 52, 53 provide support and strengthening to the nacelle 12, in that in the event of the force absorbing material 34 being radially outwardly deformed by an impact thereon, the bulkheads 48, 50, 52, 53 resist the deformation of the inner skin to maintain the integrity of the nacelle 12.

Referring to FIG. 3, which is a close up of the region marked III in FIG. 2 it can be seen that the inner skin 36 comprises sound absorbing material 54 and the bulkhead 48 extends there from radially outwardly, and against which the force absorbing material 34 abuts.

The nacelle 12 is supported by a pedestal 56 which provides a means of attachment of the engine to the fuselage of an aircraft.

Figure 4:
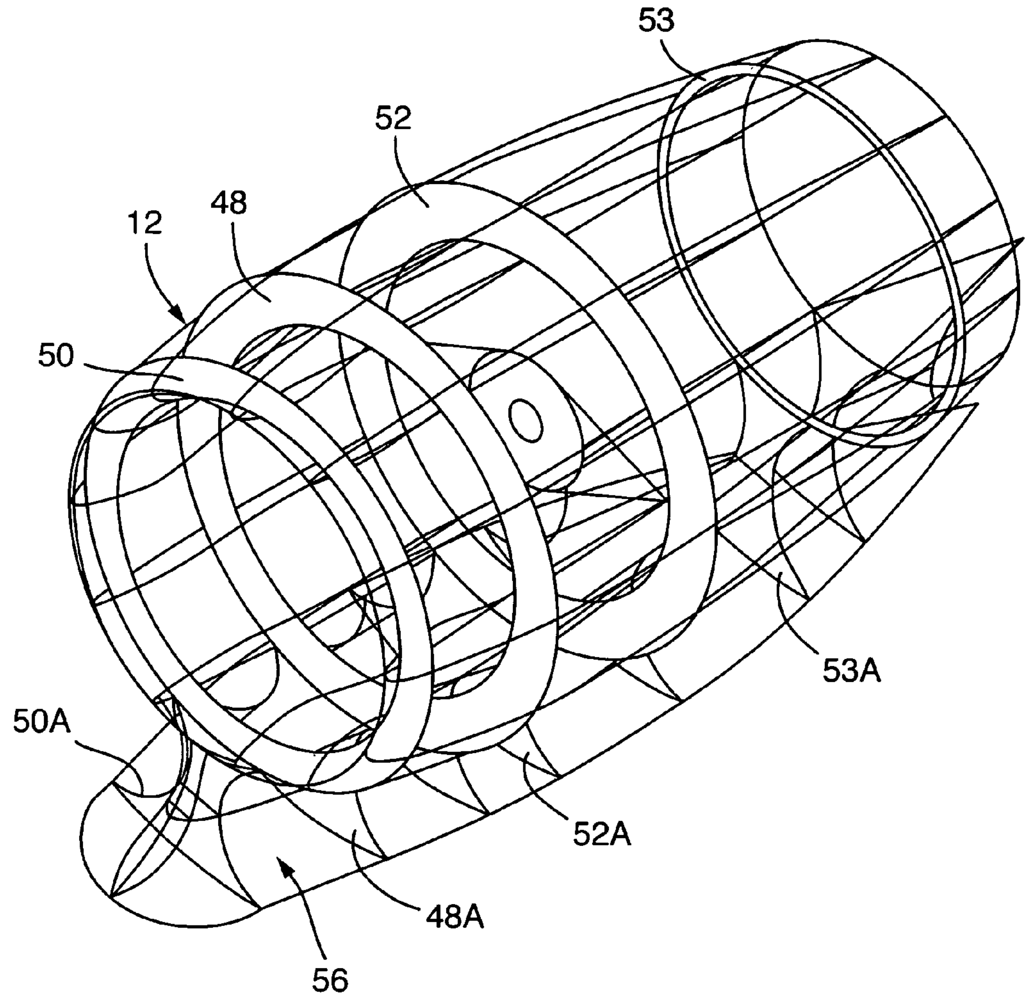
FIG. 4 is a perspective view of the nacelle shown in FIG. 2 indicating support members within the nacelle.

Referring to FIG. 4, which shows a perspective view of the nacelle 12 shown in FIG. 2, but with the inner and outer skins removed. In FIG. 4, the bulkheads 48, 50, 52, 53 are shown, and it can be seen that the bulkheads 48, 50, 52, 53 extend outwardly by means of extensions 48A, 50A, 52A, 53A of each respective bulkhead 48, 50, 52, 53 to the pedestal 56, whereby loads on the bulkheads 48, 50, 52 are transmitted to the pedestal 56, thereby supporting and strengthening the nacelle 12.

Figure 5:
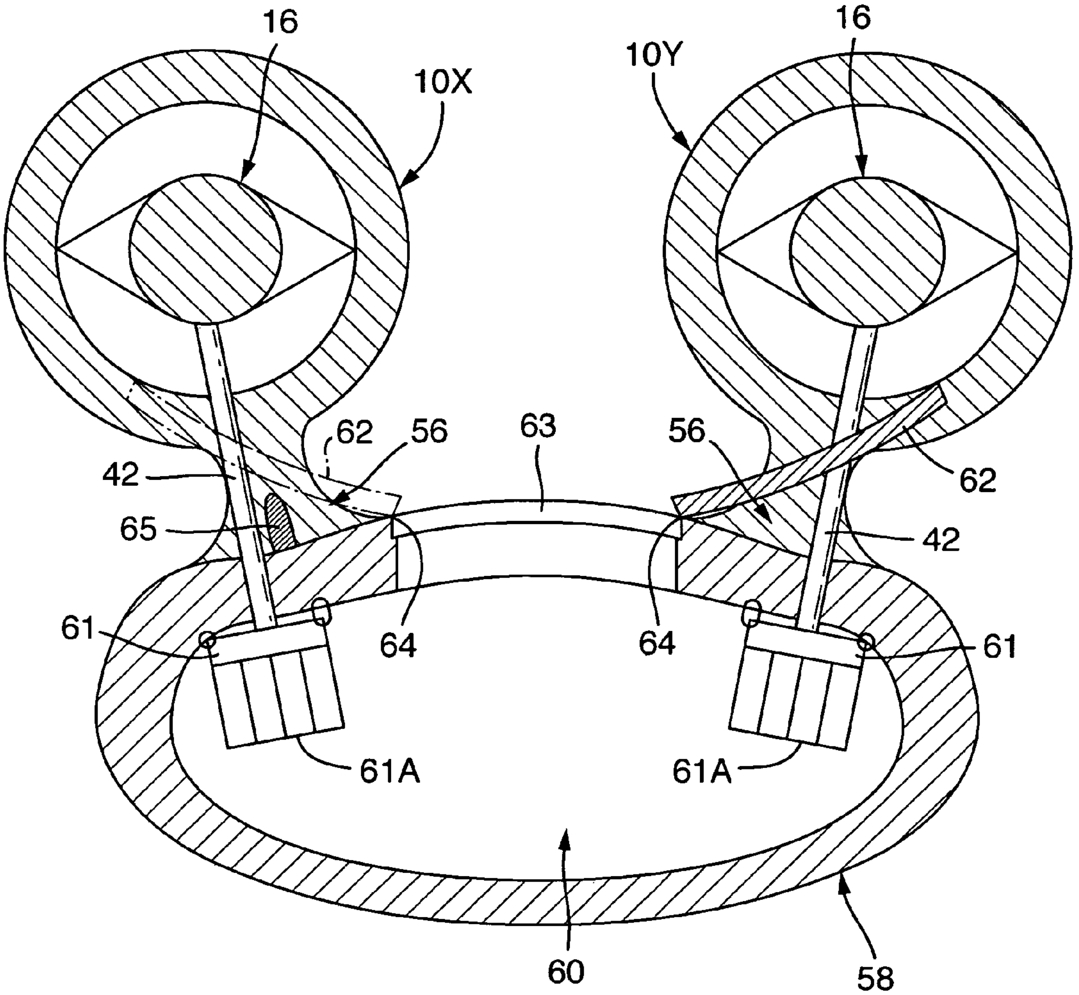
FIG. 5 is a front sectional view of an aircraft fuselage incorporating two engines.

Referring to FIG. 5, there is shown a diagrammatic cross sectional front view of a fuselage 58 of an aircraft in which a pair of engines, 10X, 10Y are mounted thereon extending upwardly from the fuselage. As can be seen, the off take shaft 42 extends radially outwardly from each engine through the pedestal 56 to a chamber 60 within the fuselage 58 of the aircraft. Each of the off take shafts 42 extends to a respective gearbox 61, upon which are mounted ancillary components 61A, such as generators, pumps and the like, which allows power to be transferred from the engine 10X, 10Y to the necessary regions of the aircraft, for example, to provide electrical power. The arrangement of such ancillary components in the chamber 60 provides the advantage that it is no longer necessary for a maintenance worker to carry out work on the ancilliary components 61A within the engine.

A trap door 62 provides an opening 63 to allow access from the chamber 60 to the engines 10X, 10Y. The trapdoor 62 can be connected by a hinge 64 to the fuselage 58.

The trap door 62 is connected by releasable hinges 64 to each opposite side of the opening 63, thus allowing it to be opened in either direction, as shown in solid lines and in broken lines in FIG. 55.

When it is desired to carry out maintenance on the right hand engine 10Y (as shown in FIG. 5), the left hand hinge 64 is released to allow the trap door 64 to be swung outwardly towards the engine 10Y to the position shown in R solid lines in FIG. 5. In this position, the trapdoor 62 can be used as a work surface by the maintenance worker.

If the maintenance worker desires to work on the left hand engine 10X, the trapdoor 62 can be closed and the left hand hinge re-engaged with the trap door 62. The right hand hinge can then be released to allow the trapdoor 62 to be swung outwardly towards the engine 10× to the position shown in broken lines in FIG. 5. In this position, the trap door 62 can be used as a work surface, as before.

Each of the engines 10*a*, 10*b* can be located in its correct position on the fuselage 58 by dowels 64 provided at opposite end regions of the pedestal 56 at the interface between the pedestal 56 and the fuselage 58. The dowels 64 extend into suitable recesses in the respective pedestal 56 of each of the engines 10*a*, 10*b*.

Figure 6:
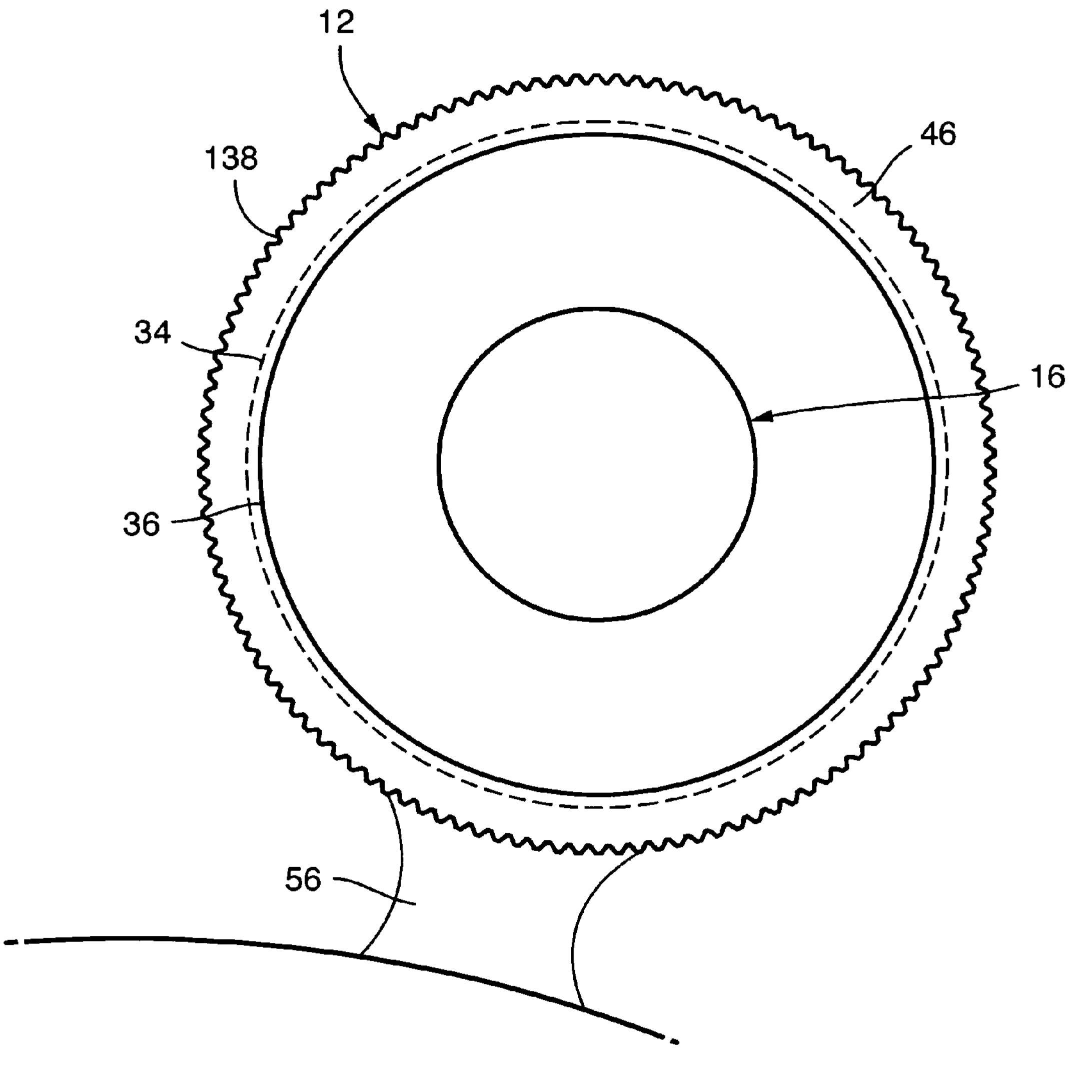
FIG. 6 is a sectional view of an alternative embodiment of a containment system used in a gas turbine engine.

Referring to FIG. 6, there is shown a diagrammatic cross sectional front view of a further embodiment of the invention, in which the force absorbing arrangement comprises a corrugated outer skin 138 of the nacelle 12. The provision of the corrugations in the outer skin 138 of the nacelle allows the outer skin to stretch radially outwardly in the event of impact thereon by a fragment of a failed component. It will be appreciated that the corrugated outer skin 138 can be used in conjunction with a force absorbing material 34 provided as a layer on the inner skin 36 between the inner and outer skins 36, 138. For ease of reference, the force absorbing material 34 is shown in broken lines in FIG. 6.

There is thus described a simple and effective way to contain fragments of failed components of a gas turbine engine to prevent the failed components bursting from the engine and causing damage elsewhere, for example to the fuselage, wings or tail fins of the aeroplane, or to the adjacent other engine. A further modification is that other force absorbing materials could be used, for example metallic or non-metallic structures, knitted structures, feather type armour, or bulk head containment. In the further modification, a tie member could extend between the engines to share the load.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An aircraft comprising:

a fuselage wherein the fuselage defines a chamber;

a pedestal; and a gas turbine engine mounted to the fuselage via the pedestal, the gas turbine engine having ancillary components situated within the chamber, and having a containment system that includes:

a force absorbing arrangement for absorbing the force exerted thereon by an ejected portion of a failed component of the engine, the force absorbing arrangement including a casing circumferentially surrounding at least a major proportion of the axial length of the engine;

the ancillary components including a power off take arrangement to extract power from a main shaft of the engine, the power off take arrangement including:

an off take shaft extending from the aforesaid main shaft to the chamber; and a gear box arrangement to transmit rotary power from the shaft to the components, wherein the force absorbing arrangement comprises a force absorbing material wrapped around the casing circumferentially surrounding the engine, the casing having an outer skin formed of a corrugated material to allow radially outward deformation of the outer skin upon impact of the force absorbing material, the impact on the outer skin allowing radial outward deformation of the force absorbing material.

2. The aircraft according to claim 1 wherein the force absorbing arrangement is arranged to absorb the force exerted thereon by an ejected portion of a failed disc.

3. The aircraft according to claim 1 wherein the force absorbing material comprises a para-aramid material.

4. The aircraft according to claim 1 wherein the force absorbing material comprises poly-paraphenylene terephthalamide.

5. The aircraft according to claim 1 wherein the engine includes rotary driving components and the casing surrounds the rotary driving components, the casing having an inner skin and the outer skin, and the force absorbing arrangement is provided on the casing between the inner and outer skins of the casing.

6. The aircraft according to claim 5 wherein the casing comprises a nacelle surrounding the engine.

7. The aircraft according to claim 5 wherein a plurality of support members are provided within the casing, each extending circumferentially around the casing, the support members being spaced from one another along an axial length of the casing.

8. The aircraft according to claim 7 wherein the support members extend from the inner skin to the outer skin.

9. The aircraft according to claim 7, wherein the support members extend from the casing to the pedestal, whereby to transmit forces from the casing to the pedestal.

10. The aircraft according to claim 1 wherein the force absorbing material is provided as a layer adjacent the inner skin of the casing.

11. The aircraft according to claim 1 wherein where the engine includes a fan and an intermediate pressure compressor, and the force absorbing arrangement comprises a first section of the force absorbing material extending from a region surrounding or upstream of the fan of the engine to a region surrounding the intermediate pressure compressor of the engine.

12. The aircraft according to claim 11 wherein the engine includes a high pressure compressor and a high, intermediate and low pressure turbines and the force absorbing arrangement comprises a second section of the force absorbing material extending from a region surrounding the high pressure compressor to a region surrounding or downstream of the low pressure turbine.

13. The aircraft according to claim 1 wherein the force absorbing material is wrapped around the engine with appropriate tension to allow the force absorbing material to deform radially outwardly within the casing to absorb the force of an ejected fragment of a failed component.

14. The aircraft according to claim 1 wherein the engine is secured to the casing by strengthening arrangements, each strengthening arrangement comprising an A frame extending from the engine to the casing.

15. The aircraft according to claim 1, wherein the chamber is defined externally of the engine to include the ancillary components of the engine.

16. An aircraft comprising:

a fuselage wherein the fuselage defines a chamber;

a pedestal; and a gas turbine engine mounted to the fuselage via the pedestal, the gas turbine engine having ancillary components situated within the chamber, and having a containment system that includes:

a force absorbing arrangement for absorbing the force exerted thereon by an ejected portion of a failed component of the engine, the force absorbing arrangement circumferentially surrounding at least a major proportion of the axial length of the engine;

the ancillary components including a power off take arrangement to extract power from a main shaft of the engine, the power off take arrangement including:

an off take shaft extending from the aforesaid main shaft to the chamber; and a gear box arrangement to transmit rotary power from the shaft to the components, wherein the force absorbing arrangement comprises a corrugated outer skin of a casing surrounding the engine.

17. The aircraft according to claim 16, wherein the engine includes rotary driving components and the containment system includes a casing extending circumferentially around the rotary driving components, a plurality of support members extending circumferentially around the casing, wherein each support member extends to the pedestal, whereby loads on the support members can be transmitted to the pedestal.

18. The aircraft according to claim 16 wherein the force absorbing material comprises a para-aramid material.

19. The aircraft according to claim 16 wherein where the engine includes a fan and an intermediate pressure compressor, and the force absorbing arrangement comprises a first section of the force absorbing material extending from a region surrounding or upstream of the fan of the engine to a region surrounding the intermediate pressure compressor of the engine; and wherein the engine includes a high pressure compressor and a high, intermediate and low pressure turbines and the force absorbing arrangement comprises a second section of the force absorbing material extending from a region surrounding the high pressure compressor to a region surrounding or downstream of the low pressure turbine.

20. The aircraft according to claim 16 wherein the force absorbing material is wrapped around the engine with appropriate tension to allow the force absorbing material to deform radially outwardly within the casing to absorb the force of an ejected fragment of a failed component.

* * * * *